United States Patent
Bouti et al.

(10) Patent No.: US 8,282,870 B2
(45) Date of Patent: Oct. 9, 2012

(54) SAFETY CONNECTOR FOR HOT RUNNER, HAVING LATCH DESTRUCTIVELY INTERLOCKING VALVE STEM WITH ACTUATION PLATE

(75) Inventors: Abdeslam Bouti, Swanton, VT (US); Stephen Linwood Gray, Cambridge, VT (US); Thomas Andrew Lawrence, Burlington, VT (US)

(73) Assignee: Husky Injection Molding Systems Ltd., Bolton, Ontario (CA)

( * ) Notice: Subject to any disclaimer, the term of this patent is extended or adjusted under 35 U.S.C. 154(b) by 125 days.

(21) Appl. No.: 12/934,153

(22) PCT Filed: Mar. 17, 2009

(86) PCT No.: PCT/US2009/037370
§ 371 (c)(1),
(2), (4) Date: Sep. 23, 2010

(87) PCT Pub. No.: WO2009/120534
PCT Pub. Date: Oct. 1, 2009

(65) Prior Publication Data
US 2011/0018172 A1   Jan. 27, 2011

Related U.S. Application Data

(60) Provisional application No. 61/038,798, filed on Mar. 24, 2008, provisional application No. 61/044,949, filed on Apr. 15, 2008.

(51) Int. Cl.
*B29C 45/22* (2006.01)
*B29C 45/23* (2006.01)

(52) U.S. Cl. ............... 264/328.8; 264/328.9; 425/562; 425/564

(58) Field of Classification Search ............ 264/328.1, 264/328.15, 328.8, 328.9; 425/549, 562–566
See application file for complete search history.

(56) References Cited

U.S. PATENT DOCUMENTS

| | | | |
|---|---|---|---|
| 3,444,775 A | 5/1969 | Hills | |
| 4,285,661 A | 8/1981 | Yotsutsuji et al. | |
| 5,078,589 A | 1/1992 | Osuna-Diaz | |
| 5,122,007 A | 6/1992 | Smith | |
| 6,056,535 A | 5/2000 | Shimizu | |
| 6,241,113 B1 | 6/2001 | Mozley et al. | |
| 6,276,916 B1 | 8/2001 | Schad et al. | |
| 6,431,383 B1 | 8/2002 | Mozley et al. | |
| 6,599,116 B2 | 7/2003 | Lee et al. | |
| 6,755,641 B1 | 6/2004 | Nakanishi | |
| 6,939,073 B1 | 9/2005 | Ahmed et al. | |
| 7,131,834 B2 | 11/2006 | Babin et al. | |
| 7,931,455 B2 * | 4/2011 | Tabassi | 425/3 |
| 8,100,689 B2 * | 1/2012 | Bouti et al. | 425/564 |
| 2011/0304075 A1 * | 12/2011 | Catoen et al. | 264/328.1 |

* cited by examiner

*Primary Examiner* — Jill Heitbrink

(57) ABSTRACT

Disclosed is a safety connector (100; 200; 300) for a hot runner (600) having a valve stem (104) and an actuation assembly (102), the safety connector (100) including: a shear member (106) releasably interlocking the valve stem (104) with the actuation assembly (102), once the shear member (106) has interlocked the valve stem (104) with the actuation assembly (102), the valve stem (104) becomes movable in response to movement of the actuation assembly (102), and the shear member (106) being configured to shear destructively, and responsive to a predetermined undesired force acting on the shear member (106), the shear member (106) shears and the valve stem (104) becomes released from the actuation assembly (102).

17 Claims, 13 Drawing Sheets

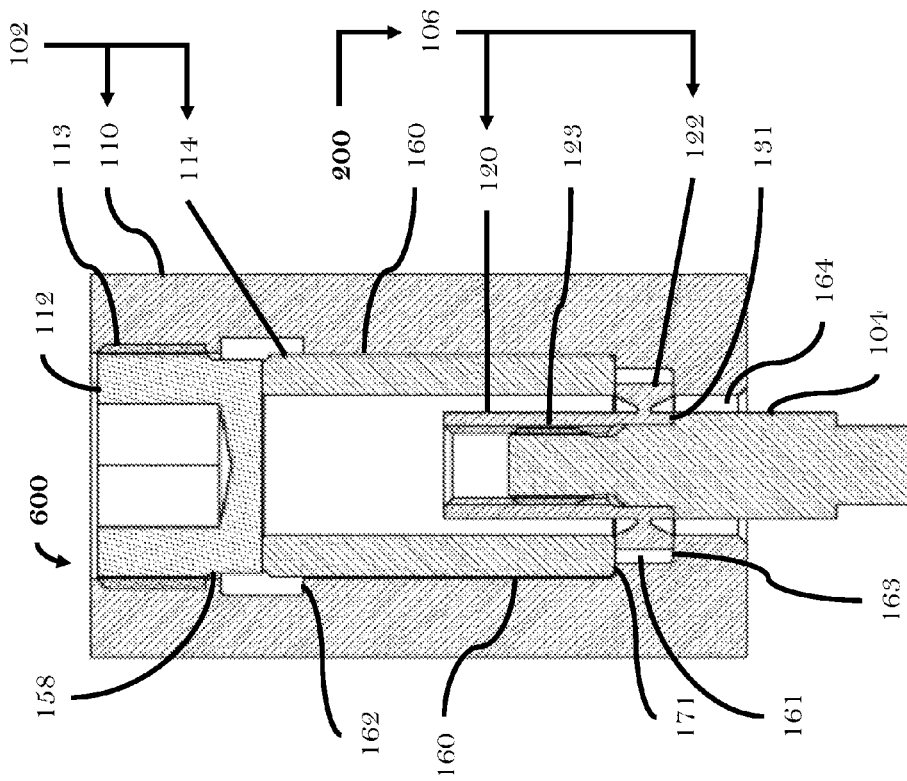
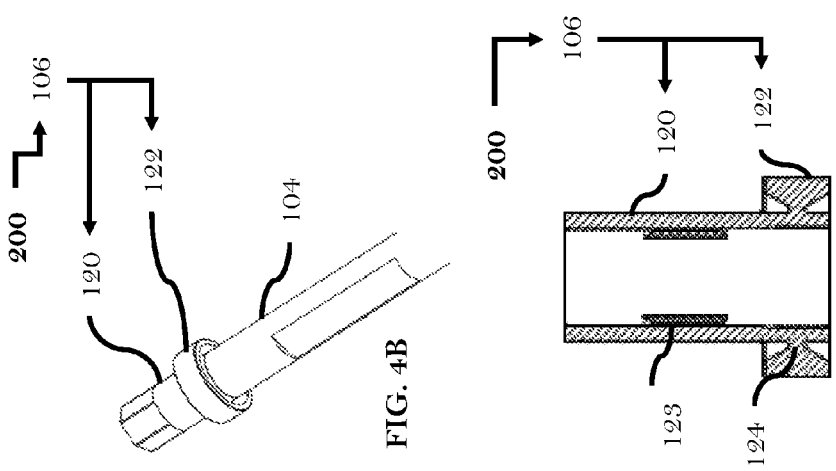

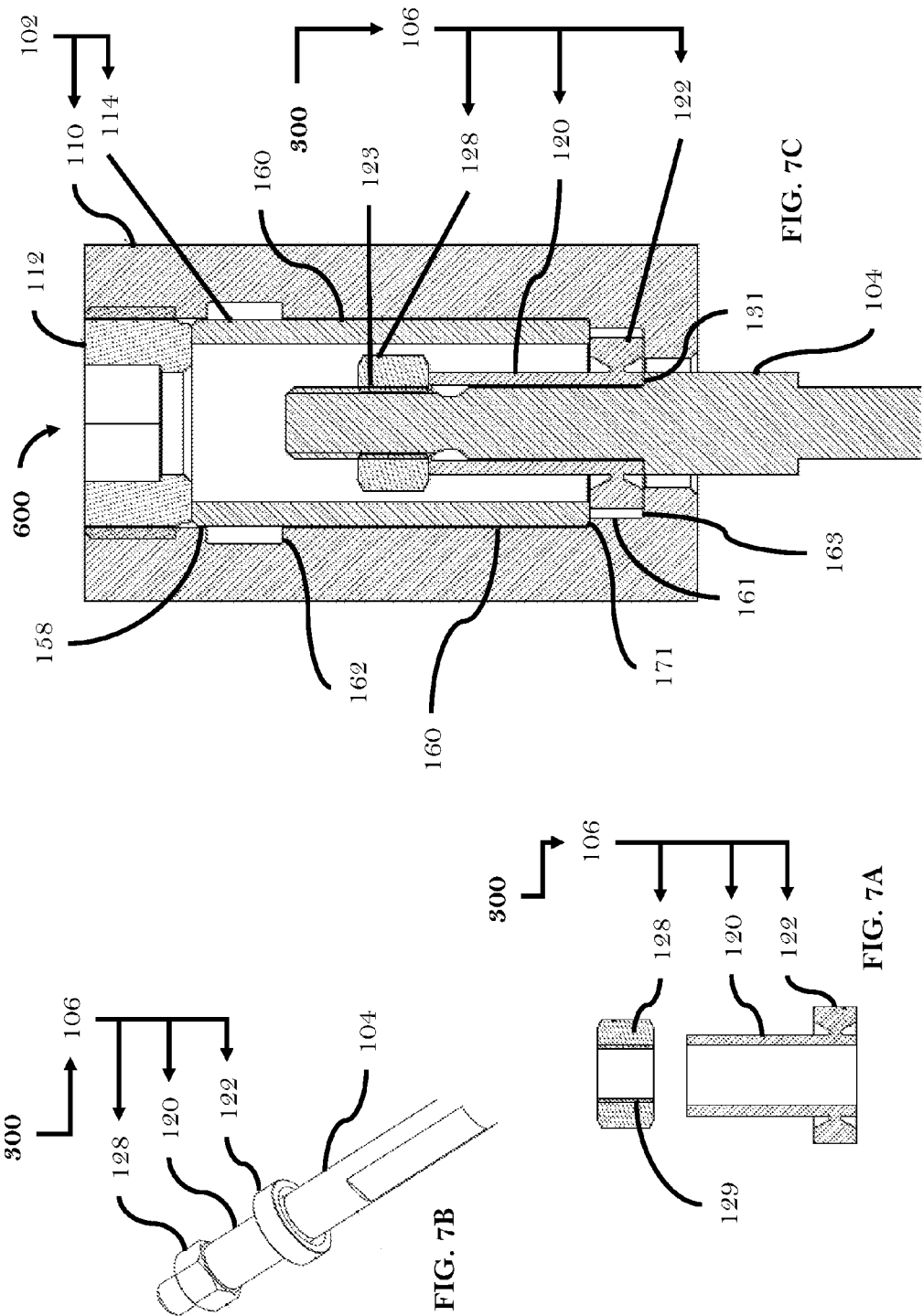

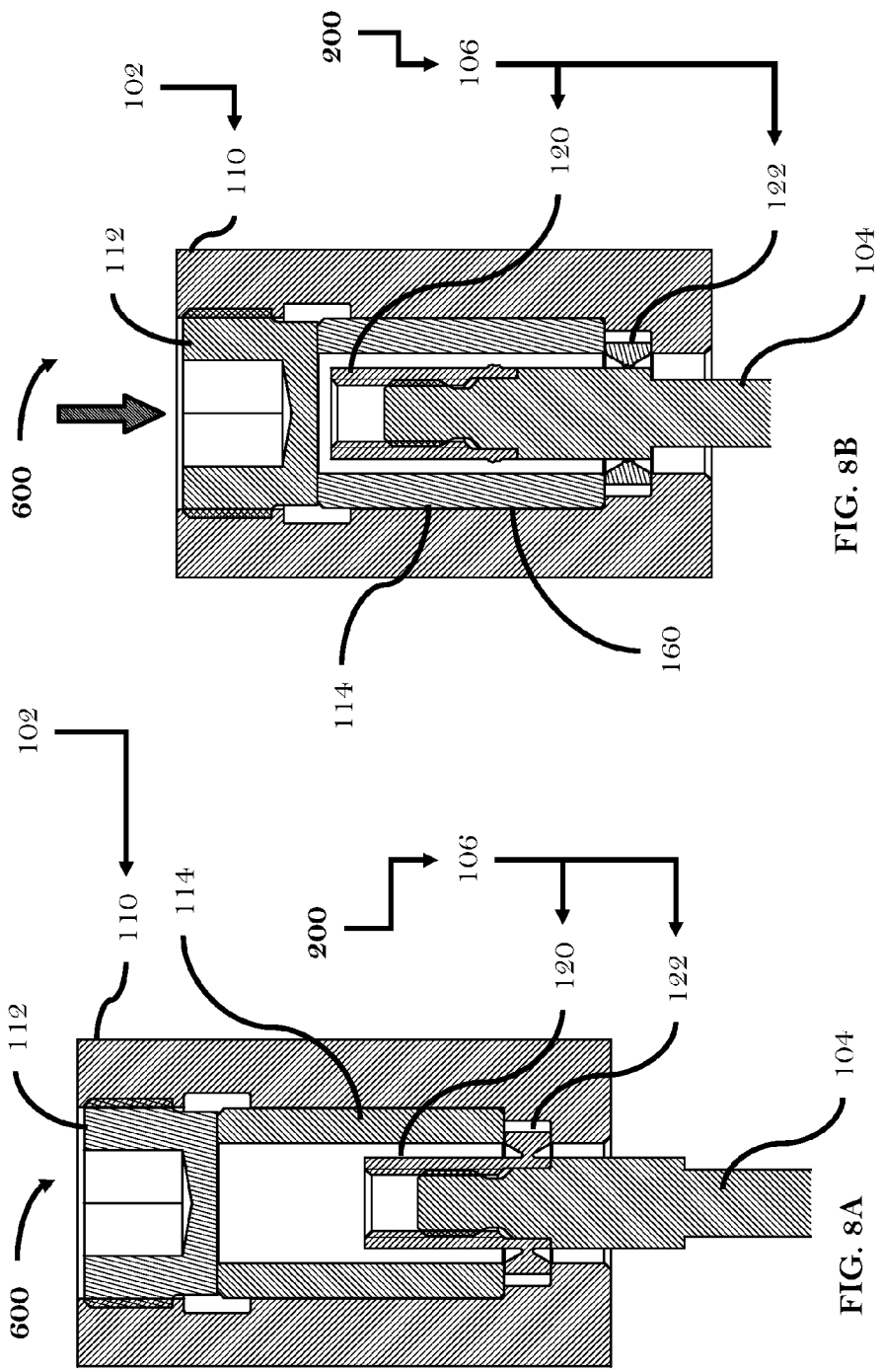

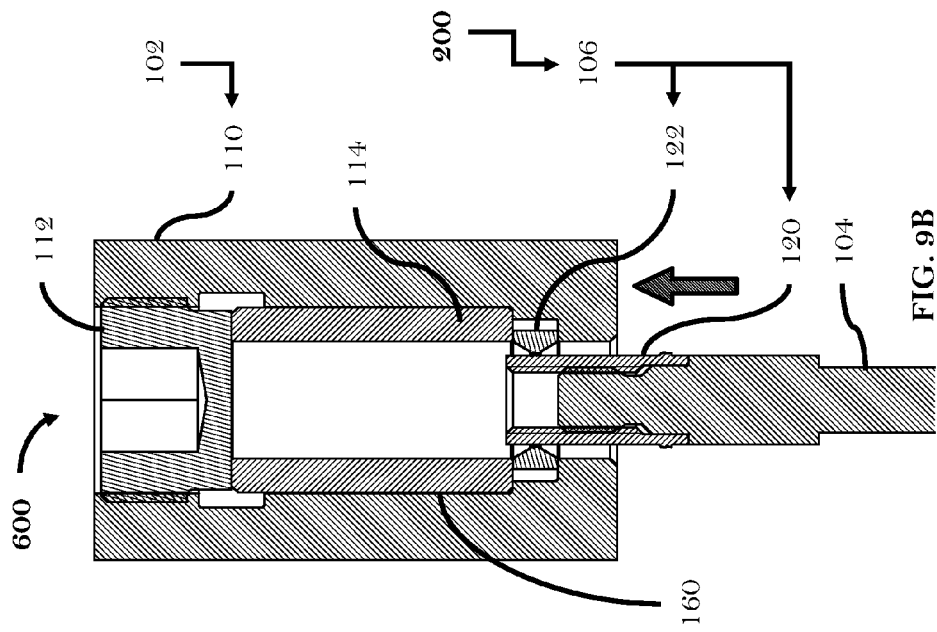
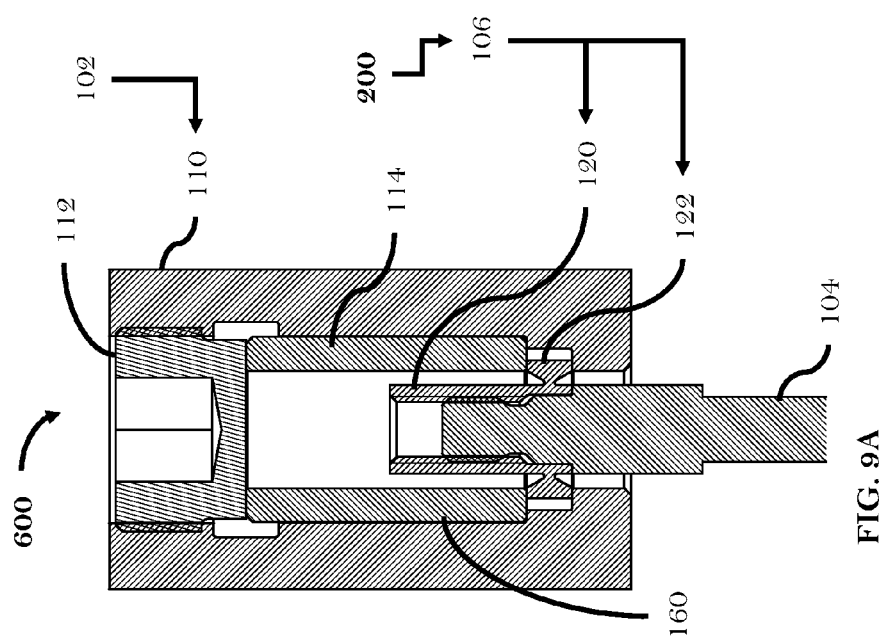

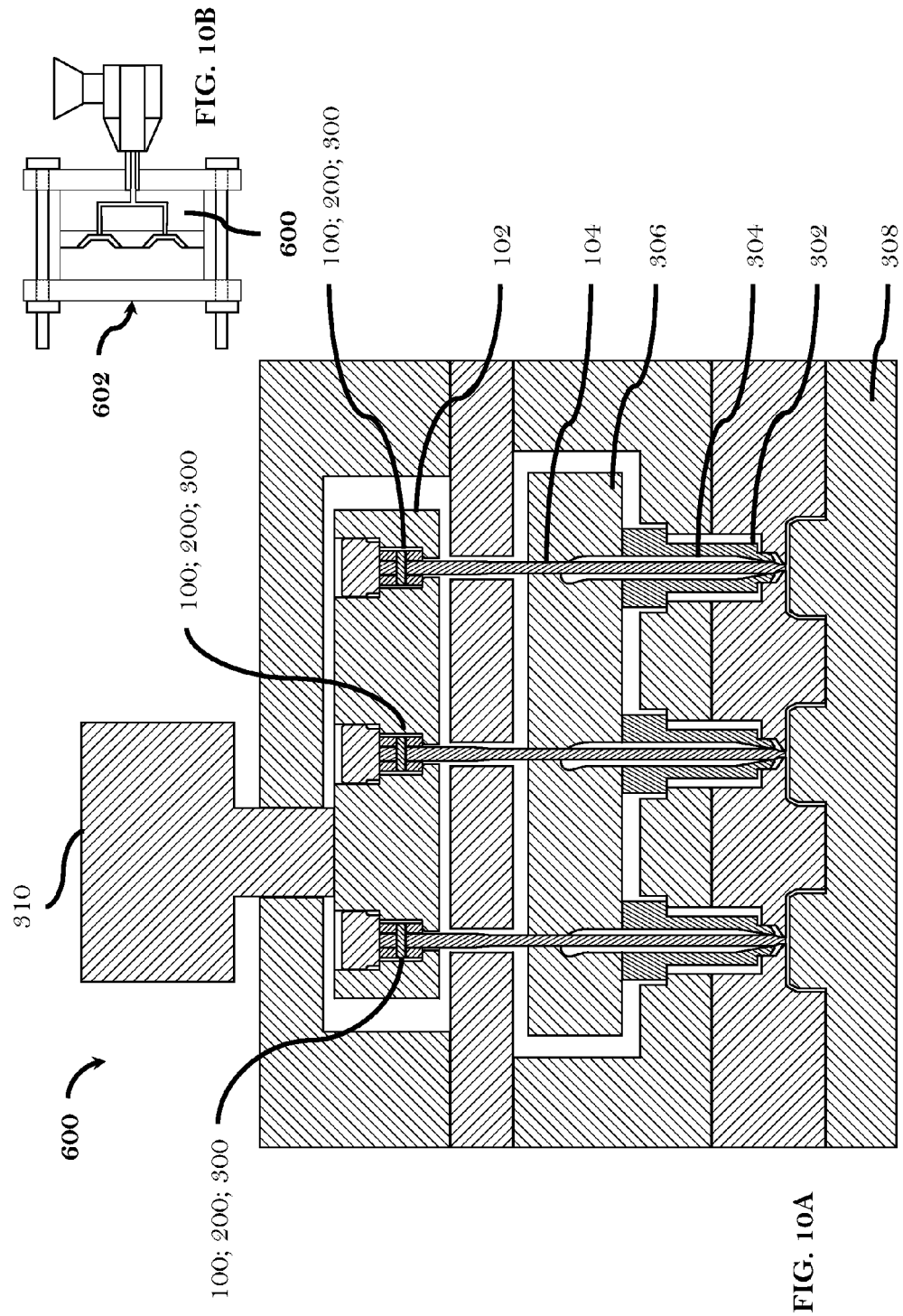

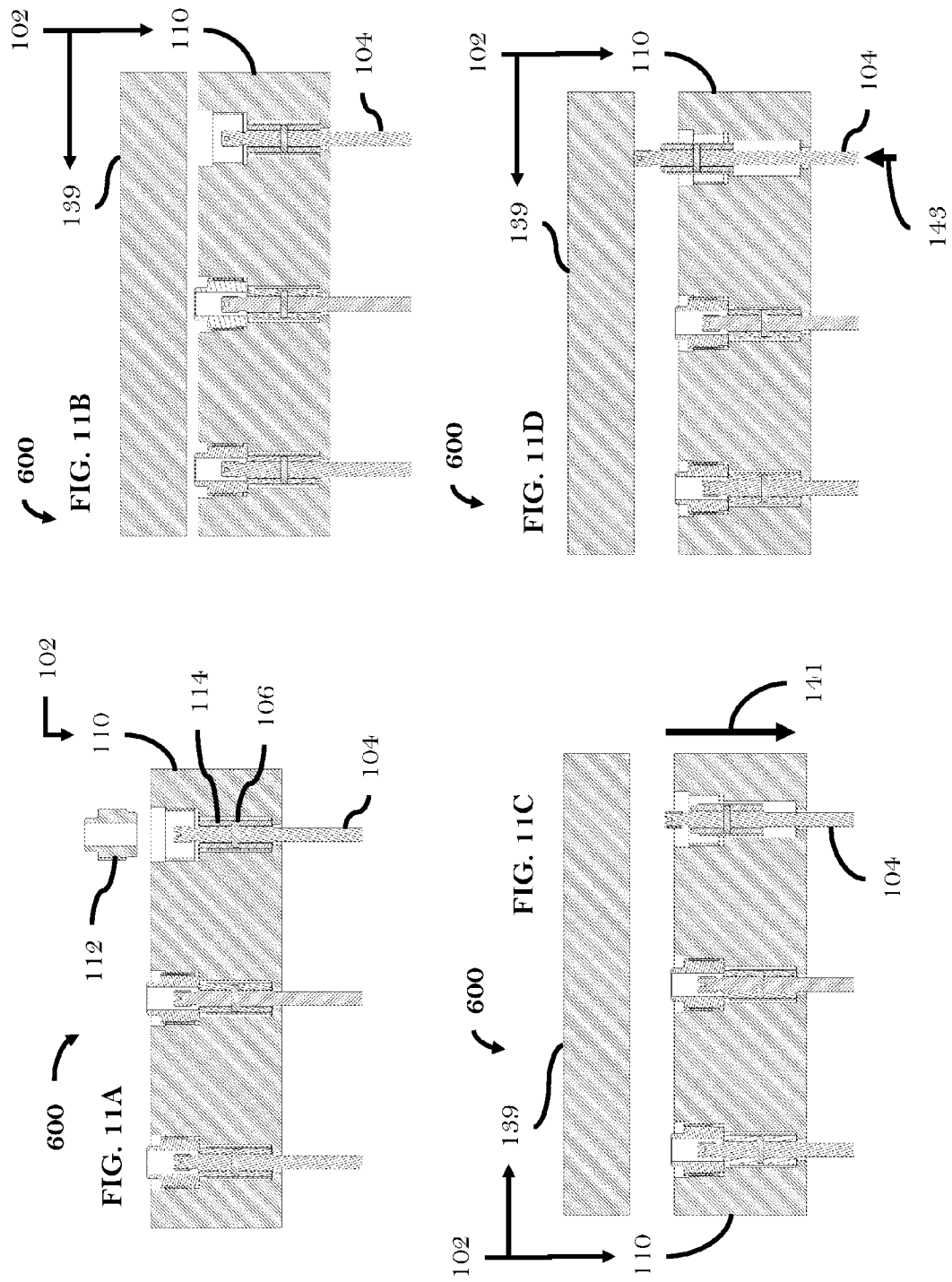

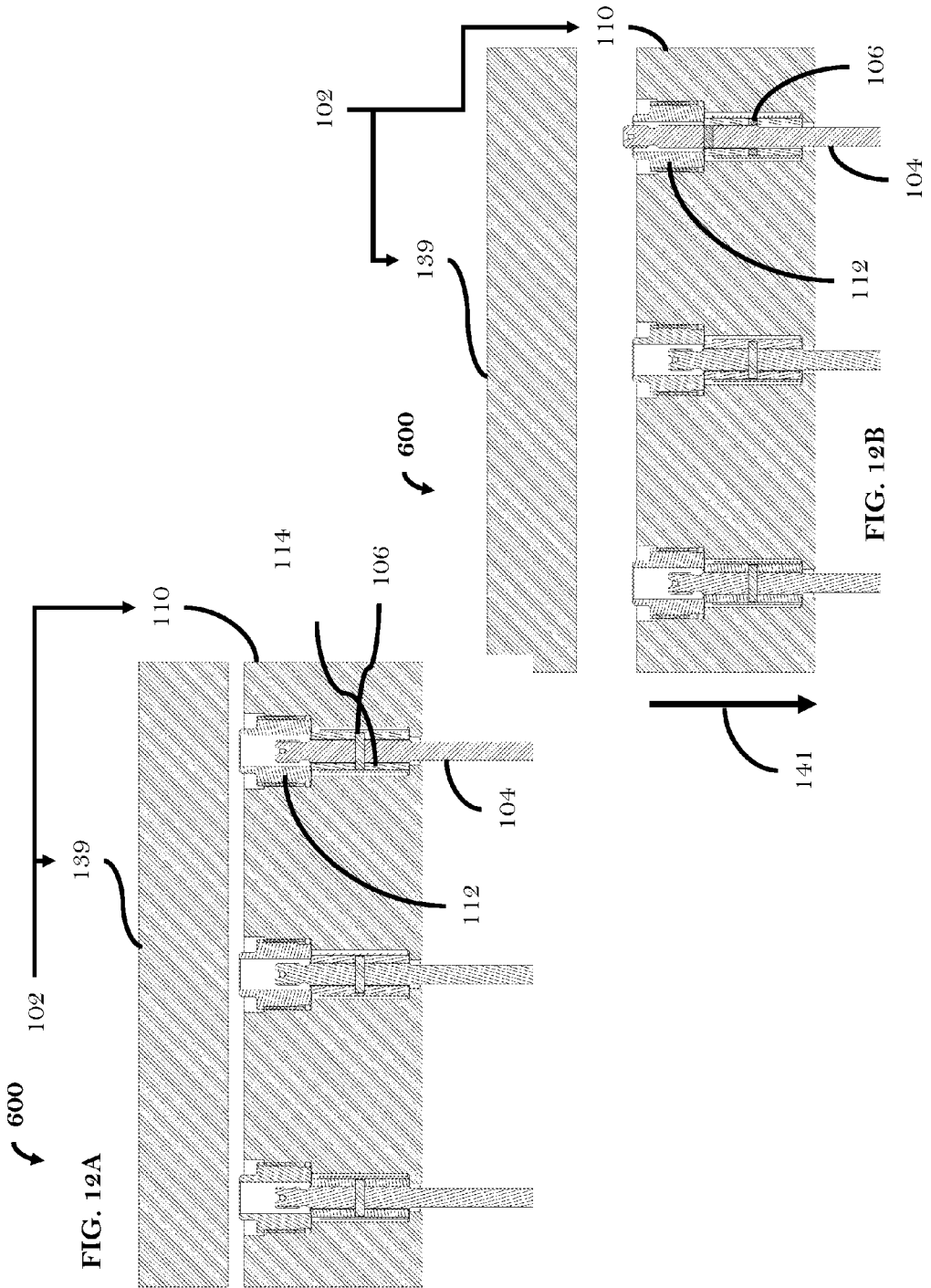

US 8,282,870 B2

SAFETY CONNECTOR FOR HOT RUNNER, HAVING LATCH DESTRUCTIVELY INTERLOCKING VALVE STEM WITH ACTUATION PLATE

TECHNICAL FIELD

The Present invention generally relates to molding systems, and more specifically, the present invention relates to a valve stem and a plate member configured to decouple responsive to movement of the valve stem relative to an actuation plate.

BACKGROUND OF THE INVENTION

U.S. Pat. No. 5,078,589 (Inventor: OSUNA-DIAZ; Publication Date: Jan. 7, 1992) discloses an arrangement for independently controlling shutoff and flow to a cavity gate in a multicavity injection mold apparatus, in which a plurality of valve pins is mounted to a movable holder plate. Each of the valve pins is aligned with a cavity gate and are movable thereinto to control shutoff. A plurality of fixed position plunger sleeves is mounted to a respective valve pin and is adjustably positioned with respect to a restriction feature in the supply passage upstream of the associated gate.

U.S. Pat. No. 6,056,535 (Inventor: SHIMIZU; Publication Date: May 2, 2000) discloses an injection molding machine including a processing pin provided in a fixed mold side is provided. A movable member is arranged in a space between the fixed mold and a fixed plate, the processing pin can be moved forward and backward together with the movable member with rear end portion thereof fixed to the movable member. An end portion of the processing pin is inserted into a mold plate so that it can go in and out of a gate or a cavity by the forward and backward movement of the movable member moved by a drive unit. The above construction can eliminate positional limitation due to a position of a projecting pin in a conventional injection molding machine.

U.S. Pat. No. 6,276,916 (Inventor: SCHAD et al.; Publication Date: Aug. 21, 2001) discloses a failsafe device, or pressure relief mechanism, for a shooting pot actuator in an injection molding machine. The shooting pot actuator has a multiple pusher rods mounted on one, or more, plates. Moving the plate holding the pusher rods depresses the shooting pot injection pistons and injects molten material into a number of mold cavities. To avoid damage to the machine from the pusher rods if an injection piston seizes, a failsafe device is used to mount the pusher rods to the plates. A shearing member is interposed, or sandwiched, between first and second apertures. Typically, the shearing member is a plate that, in normal operating conditions, blocks rearward movement of the pusher rod. However, when a predetermined shear force is applied to the shear plate, the shearing member shears and the pusher rod retracts within the channel, thereby alleviating the pressure. The fail-safe device can be paired with a seizure detection system, using a laser beam, which detects piston and valve gate seizure, and provides appropriate notification or control signals.

U.S. Pat. No. 6,755,641 (Inventor: NAKANISHI; Publication Date: Jun. 29, 2004) discloses a stack injection molding apparatus has first and second arrays of valve gate injection nozzles and separate mechanisms for independently actuating the nozzles of each array. A separate reciprocating yoke plate engages the valve pin of each nozzle array, and is actuated by either one centrally located actuator or a pair of symmetrically located actuators.

U.S. Pat. No. 7,131,834 (Inventor: BABIN et al.; Publication Date: Nov. 11, 2007) discloses an adjustment device for a valve pin on an injection molding machine, and particularly on a multi-cavity machine, having a plurality of valve pins mounted on a common yoke plate which is actuated by a common actuator. The adjustment device includes a valve pin holder for holding the valve pin, and a locking member. The valve pin holder has two threaded portions. The first threaded portion is adjustable within a threaded receiving hole in the yoke plate. The second threaded portion is received by the locking member. The locking member has a bottom shoulder which butts against the yoke plate, and retains the valve pin holder in place.

SUMMARY OF THE INVENTION

When injection molding using hot runner nozzles having valve stems to shut off plastic flow, it may be an advantage to attach multiple valve stems to a single actuation plate. This arrangement allows simultaneous filling of several cavities that are defined by a mold. When actuating multiple valve stems from a single actuation plate, it may be possible for a single valve stem to inadvertently take the entire load from the actuation plate. This unfortunate condition may occur when a single valve stem becomes obstructed (such as for the case that may occur when a valve stem becomes seized, a mold gate becomes frozen or a nozzle becomes frozen). This undesirable condition may result in: (i) failure to move (or to operate) the valve stem, and/or (ii) inadvertent damage to other components of the hot runner and/or the hot runner nozzle.

According to a first aspect, the present invention provides a safety connector (100; 200; 300) for a hot runner (600) having a valve stem (104) and an actuation assembly (102), the safety connector (100) including: a shear member (106) releasably interlocking the valve stem (104) with the actuation assembly (102), once the shear member (106) has interlocked the valve stem (104) with the actuation assembly (102), the valve stem (104) becomes movable in response to movement of the actuation assembly (102), and the shear member (106) being configured to shear destructively, and responsive to a predetermined undesired force acting on the shear member (106), the shear member (106) shears and the valve stem (104) becomes released from the actuation assembly (102).

According to a second aspect, the present invention provides a hot runner (600), including: (i) a hot runner nozzle (302) that has a melt channel (304), the melt channel (304) connected with a manifold (306), the melt channel (304) is for delivering a molten molding material to a mold (308), (ii) a plate actuator (310) connected with the actuation assembly (102), the actuation assembly (102) is offset from the hot runner nozzle (302), the actuation assembly (102) is configured to move responsive to to becoming actuated to do so, (ii) a valve stem (104) is positioned, at least in part, along the melt channel (304) of the hot runner nozzle (302), the valve stem (104) is configured to be moved, at least partially, along the melt channel (304) of the hot runner nozzle (302), and (iv) a safety connector (100; 200; 300), including: a shear member (106) releasably interlocking the valve stem (104) with the actuation assembly (102), once the shear member (106) has interlocked the valve stem (104) with the actuation assembly (102), the valve stem (104) becomes movable in response to movement of the actuation assembly (102), and the shear member (106) being configured to shear destructively, and responsive to a predetermined undesired force acting on the shear member (106), the shear member (106) shears and the valve stem (104) becomes released from the actuation assembly (102).

The aspects of the present invention allows a valve stem to decouple from the actuation assembly, thus preventing damage to the valve stem and/or other components.

BRIEF DESCRIPTION OF THE DRAWINGS

A better understanding of the non-limiting embodiments of the present invention (including alternatives and/or variations thereof) may be obtained with reference to the detailed description of the non-limiting embodiments along with the following drawings, in which:

FIG. 4A depicts a cross-sectional view of a safety connector 200 (hereafter referred to as the "connector 200") according to a second non-limiting embodiment;

FIG. 4B depicts a perspective view the connector 200 of FIG. 4A;

FIG. 4C depicts another cross sectional view of the connector 200 of FIG. 4A;

FIG. 7A depicts a cross-sectional view of a safety connector 200 (hereafter referred to as the "connector 300") according to a third non-limiting embodiment;

FIG. 7B depicts a perspective view the connector 300 of FIG. 7A;

FIG. 7C depicts another cross sectional view of the connector 300 of FIG. 7A;

FIGS. 8A and 8B depict other cross sectional views of the connector 300 of FIG. 4A;

FIGS. 9A and 9B depict other cross sectional views of the connector 200 of FIG. 4A;

FIG. 10A depicts a schematic representation of a hot runner 600 for using any one of the connector 100, the connector 200 and/or the connector 300, according to a fifth non-limiting embodiment;

FIG. 10B depicts a schematic representation of a molding system 602 having the hot runner 600 of FIG. 10A;

FIGS. 11A, 11B, 11C and 11D depict a case for manual decoupling of a valve stem 104 of the hot runner 600 of FIG. 10;

FIGS. 12A and 12B depict the case for automatic decoupling of the valve stem 104 of the hot runner 600 of FIG. 10A.

The drawings are not necessarily to scale and are sometimes illustrated by phantom lines, diagrammatic representations and fragmentary views. In certain instances, details that are not necessary for an understanding of the embodiments or that render other details difficult to perceive may have been omitted.

DETAILED DESCRIPTION OF THE NON LIMITING EMBODIMENT(S)

Figure 1:
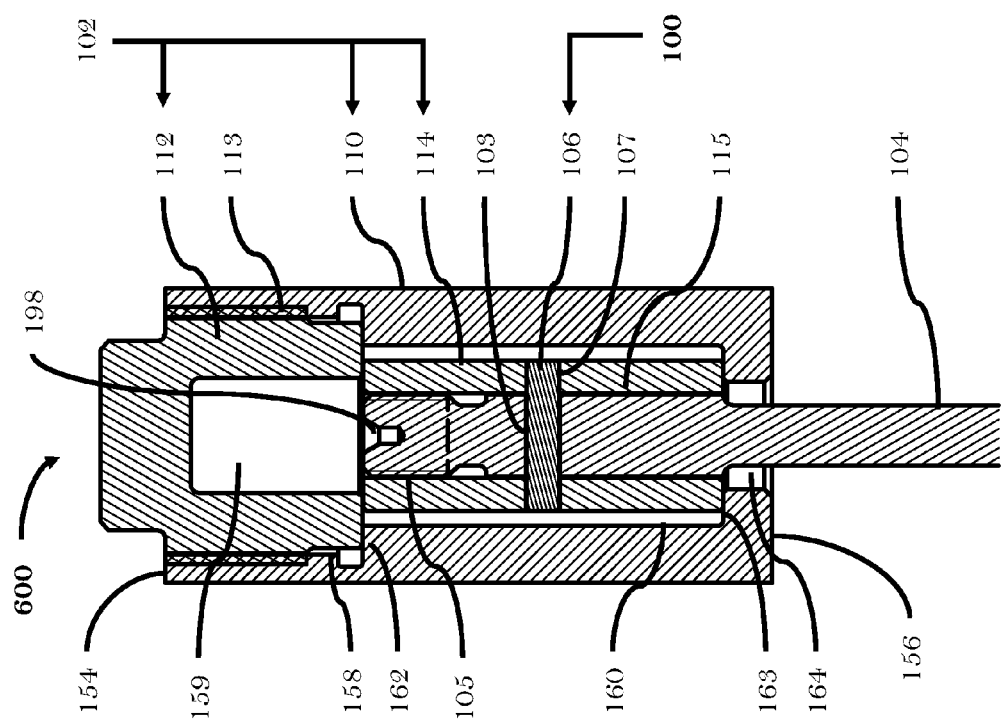
FIG. 1 depicts a cross sectional view of a safety connector 100 (hereafter referred to as the "connector 100") according to a first non-limiting embodiment.

FIG. 1 depicts the cross sectional view of the connector 100. The connector 100 is for use in a hot runner 600 that has a valve stem 104 and also has an actuation assembly 102 (hereafter referred to as the "assembly 102"). The assembly 102 is used (that is, is configured) for moving (that is, actuating movement of) the valve stem 104. The hot runner 600 is depicted in FIG. 10A.

The connector 100 includes a shear member 106 (which may also called a "shear pin", for example). The shear member 106 releasably interlocks the valve stem 104 with the assembly 102. Once the shear member 106 has interlocked the valve stem 104 with the assembly 102, the valve stem 104 becomes movable in response to movement of the assembly 102. The shear member 106 is configured to shear destructively (that is, once the shear member 106 has become broken, the shear member 106 is no longer usable as a shear member). In this manner, the shear member 106 may also be called a non-reusable "mechanical fuse". Specifically, responsive to a predetermined undesired force acting on the shear member 106, the shear member 106 shears (or becomes broken) so that the valve stem 104 may become released (or decoupled) from the assembly 102.

It will be appreciated that the valve stem 104 also (preferably but not necessarily) includes a tooling center 198, which is a bore that is used for centering the valve stem 104 during the manufacturing of the valve stem 104.

According to a non-limiting variant, the assembly 102 includes: (i) a plate 110 (which may also be called an actuation plate, for example), (ii) a plug 112 (which may also be called a set-screw, for example), and (iii) a plate member 114. The plate 110 is to be connected to a plate actuator 310 (not depicted in FIG. 10 1 but is depicted in FIG. 10A) so that the plate actuator 310 may be actuated so as to urge the plate 110 to move that in turn moves the valve stem 104. The plate 110 includes: (i) a first surface 154, and (ii) a second surface 156. The first surface 154 is offset from the second surface 156. The plate 110 defines: (i) a first bore 158, (ii) a second bore 160, and (iii) a stem channel 164. The first bore 158, the second bore 160 and the stem channel 164 are all coaxially aligned with each other along a longitudinal axis of the valve stem 104. The first bore 158 extends from the first surface 154 toward the second surface 156. The second bore 160 extends from an end of the first bore 158 toward the second surface 156. The stem channel 164 extends from an end of the second bore 160 to the second surface 156. The plate 110 includes: (i) a first stop 162, and (ii) a second stop 163. The first stop 162 is located where the first bore 158 meets up with the second bore 160. The second stop 163 is located where the second bore 160 meets up with the stem channel 164.

The plug 112 is received in the first bore 158. The plug 112 is coupled (preferably is threadably coupled via threads 113) with the plate 110. The plug 112 defines an opening 159 (which may also be called a "counter-bored hole"). The opening 159 permits the plate 110 to continue unimpeded movement in the event that: (i) the valve stem 104 becomes seized (such as, in a retracted position), and (ii) the shear member 106 becomes sheared responsive to the valve stem 104 becoming seized.

The plate member 114 is received in the second bore 160, and then the plug 112 is installed in the first bore 158 so that the plate member 114 becomes trapped in the second bore 160 between the first stop 162 and the second stop 163. The valve stem 104 is received in the stem channel 164 so as to permit an end portion of the valve stem 104 to become positioned in the second bore 160.

Assembly of the connector 100 is as follows: (i) the valve stem 104 is received in a stem passage 115 that is defined by the plate member 114, (ii) a passageway 107 defined by the plate member 114 is aligned with a channel 103 defined by the valve stem 104, (ii) the shear member 106 is then received, at least in part in passageway 107 which is aligned with the channel 103, and in this manner the valve stem 104 becomes coupled with the plate member 114 via the shear member 106, (iii) the valve stem 104 is inserted into the second bore 160 via the first bore 158 so that the plate member 114 becomes received in the second bore 160 the plate 110, so that the valve stem 104 may extend from the stem channel 164 and the plate member 114 remains received in the second bore 160, and (iv) the plug 112 is installed or coupled with the first bore 158 so that the plate member 114 becomes trapped in the second bore 160 between the first stop 162 and the second stop 163, so that in this manner the plate member 114 becomes fixedly coupled with the plate 110. Assembly of the valve stem 104, the plate member 114 and the shear member 106 is: (i) constrained in a vertical direction (that is, the vertical direction that is aligned along the longitudinal axis of the valve stem 104) between the first stop 162 and the second stop 163 of the plate 110, and (ii) allowed some movement (to some extent) along a horizontal direction (that is, the horizontal direction is aligned along a radial direction of the valve stem 104), and this horizontal arrangement accommodates for horizontal displacement due to thermal expansion along the horizontal direction. Along the vertical direction there is a cold clearance of approximately 40 microns between the plug 112 and the plate member 114 (this occurs for a cold condition of the hot runner 600). The cold clearance allows the horizontal movement of the valve stem 104 as described in the previous paragraph. The horizontal position of the valve stem 104 is constrained by the hot runner manifold, so as the hot runner manifold heats and expands, the valve stem 104 moves horizontally. The clearance allows the valve stem 104 to move freely with respect to the unheated plate 102. It will be appreciated that pneumatic valve gate systems (for hot runners) have a similar clearance between a valve stem and a piston, which allows the valve stem to move horizontally with respect to the piston as the manifold expands.

The plug 112 fixedly retains the plate member 114 in the second bore 160 of the plate 110. In the manner described above, the connector 100 has coupled the valve stem 104 with the assembly 102. The connector 100 is configured, generally, to become sheared or broken (destructively) in response to the valve stem 104 becoming seized anywhere along a stroke range of the valve stem 104.

The shear member 106 may be retained in position relative to the valve stem 104 by being interference fitted with the passageway 107 that is defined by the plate member 114. The plate member 114 is shaped to be a hollow cylinder. The shear member 106 passes through: (i) a clearance or interference-fit hole that is defined in the plate member 114, (ii) a clearance hole that is defined in the valve stem 104, and (iii) a press-fit hole located in an opposite side of the plate member 114. By interference fitting the shear member 106 to the plate member 114, individual (broken) parts of the shear member 106 may be retained after the shear member 106 becomes sheared.

For the case where the shear member 106 has become sheared (this case is not depicted), the plug 112 may be decoupled from the plate 110, the plate member 114 may then be removed from the second bore 160, and in this manner the threads 105 are exposed. The threads 105 are defined on a distal end of the valve stem 104, and the distal end of the valve stem 104 is accessible from the second bore 160 and the first bore 158 of the plate 110. A tool (not depicted) is then screwed to the threads 105, and the tool is used to pull the valve stem 104 out of the plate 110 and the hot runner 600.

Figure 2:
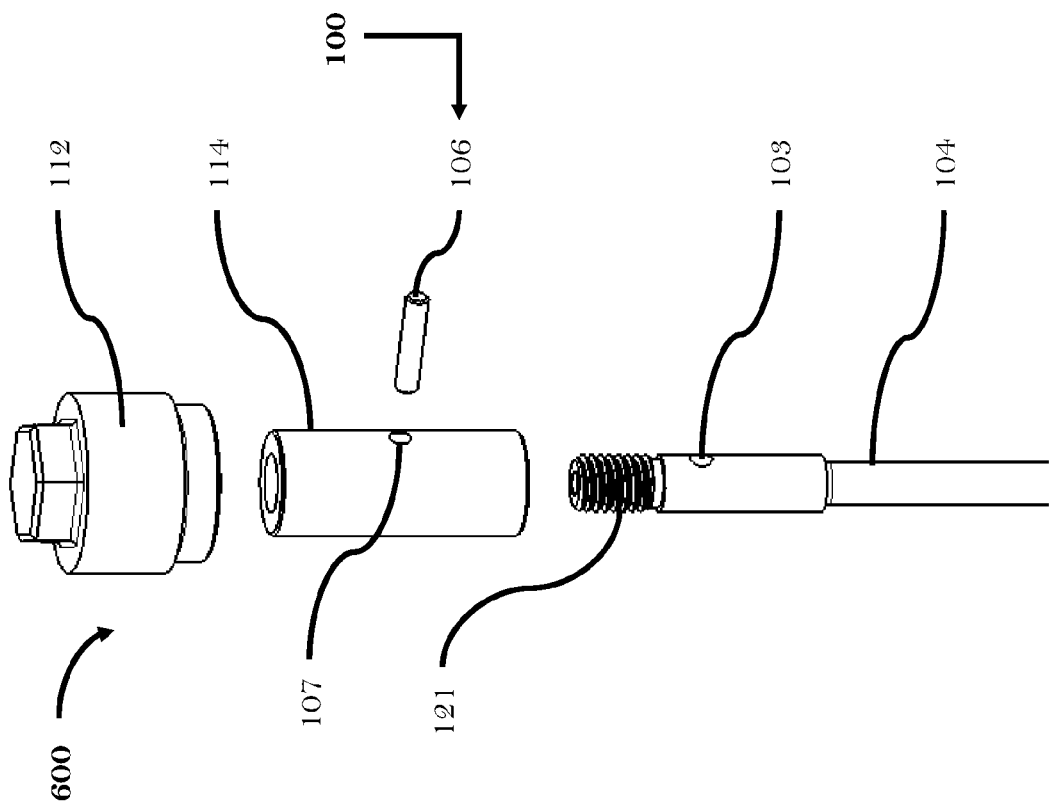
FIG. 2 depicts an exploded view of the connector 100 of FIG. 1.

FIG. 2 depicts the exploded view of the connector 100 of FIG. 1. In an initial position, the plate member 114 is attached to (or coupled with) the valve stem 104 by the shear member 106. Material and diameter of the shear member 106 are selected so that the shear member 106 may become sheared in response to a predetermined stem axial load (which is also called a predetermined undesired force) acting on the valve stem 104. The stem axial load is a load that acts along the longitudinal axis of the valve stem 104. In response to the predetermined stem axial load becoming imparted to the valve stem 104, the shear member 106 fails (or becomes destructively fragmented or sheared) so that the valve stem 104 may become separated from the plate member 114, and in effect the valve stem 104 becomes decoupled from the plate 110 because the plate member 114 will continue to remain fixedly attached with the plate 110.

According to a variant, once the shear member 106 becomes sheared into a first sheared portion and a second sheared portion. The first sheared portion of the shear member 106 continues to remain with the plate member 114 while the second sheared portion of the shear member 106 continues to remain with the valve stem 104. In this manner, the first and second sheared portions of the shear member 106 are prevented from coming free and in this manner, the first and second sheared portions are prevented from inadvertently damaging other components of the hot runner 600 of FIG. 10.

Figure 3:
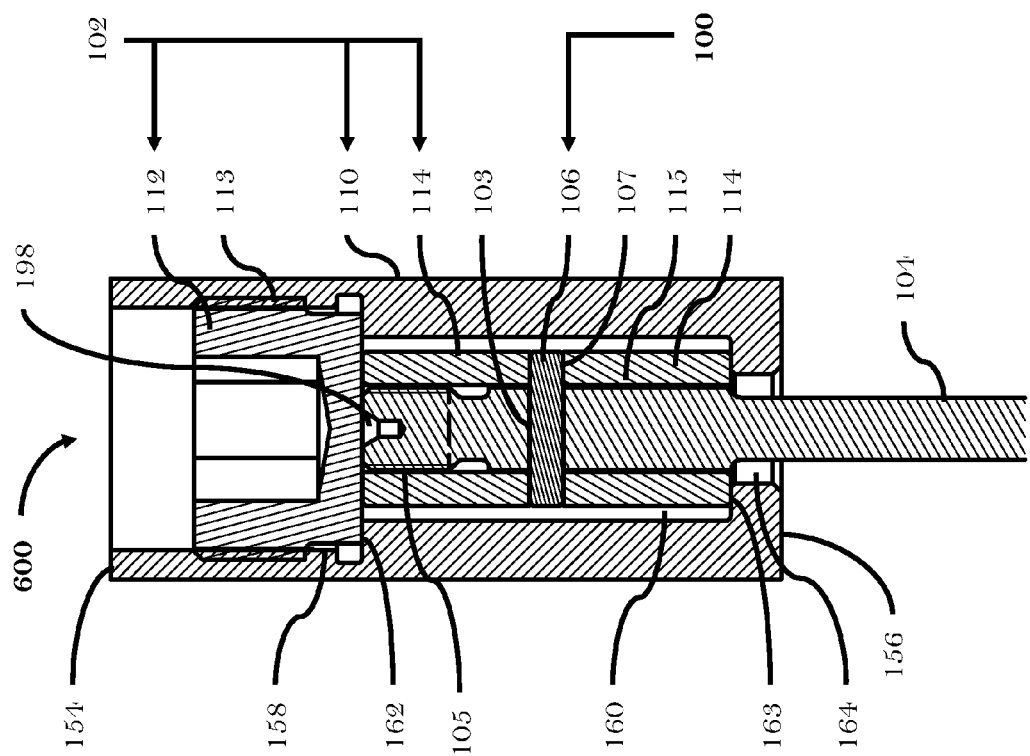
FIG. 3 depicts a cross-sectional view of the connector 100 according to a non-limiting embodiment.

FIG. 3 depicts the cross-sectional view of the connector 100. For the case where the shear member 106 fails (that is, becomes sheared and broken), the plate 110 will move and force the valve stem 104 to a gate-closed position. In the gate-closed position, the valve stem 104 is held motionless relative to a gate that leads to a mold cavity of a mold 308 (depicted in FIG. 10A) so that the molding material may not flow through the gate. The mold 308 is operatively connected with the hot runner 600. Because the plug 112 that is depicted in FIG. 3 does not have or define the opening 159 as depicted in FIG. 1, the shear member 106 becomes sheared as a result of, or in response to, (i) the valve stem 104 seizing, and (ii) the plate 110 moving towards the mold 308. It will be appreciated that in a gate-opened position, the valve stem 104 has been moved away from the gate that leads to the mold cavity of the mold 308, so that the gate becomes opened and the molding material may flow through the gate.

For the case where the shear member 106 shears at an intermediate point of the stroke of the valve stem 104, movement of the plate 110 causes the plug 112 (that is attached with the plate 110) to urge or force the valve stem 104 to the gate-closed position on the next return stroke of the plate 110 towards the gate-closed position.

FIG. 4A depicts the cross sectional view of the connector 200. The shear member 106 includes: (i) a body 120, and (ii) a frangible portion 122. The body 120 is connected with the frangible portion 122. The body 120 is configured to receive the valve stem 104, at least in part. An area of weakness 124 is located between the body 120 and the frangible portion 122. The area of weakness 124 is configured to be sheared or broken responsive to the shear member 106 experiencing the predetermined undesired force or load. The body 120 is coupled (preferably threadably coupled via threads 123) with an end of the valve stem 104 (as depicted in FIGS. 4B and 4C).

FIG. 4B depicts the perspective view the connector 200 of FIG. 4A.

FIG. 4C depicts another cross-sectional view of the connector 200 of FIG. 4A. The plate 110 further defines: (i) a third bore 161 that is located or positioned so that the third bore 161 extends from the second bore 160 to the stem channel 164, and (ii) a third stop 171 between the second bore 160 and the third bore 161, and the second stop 163 is located or defined between the third bore 161 and the stem channel 164. The third bore 161 receives the shear member 106. The plate member 114 abuts: (i) the frangible portion 122 of the shear member 106, and (ii) the plug 112.

Figure 5:
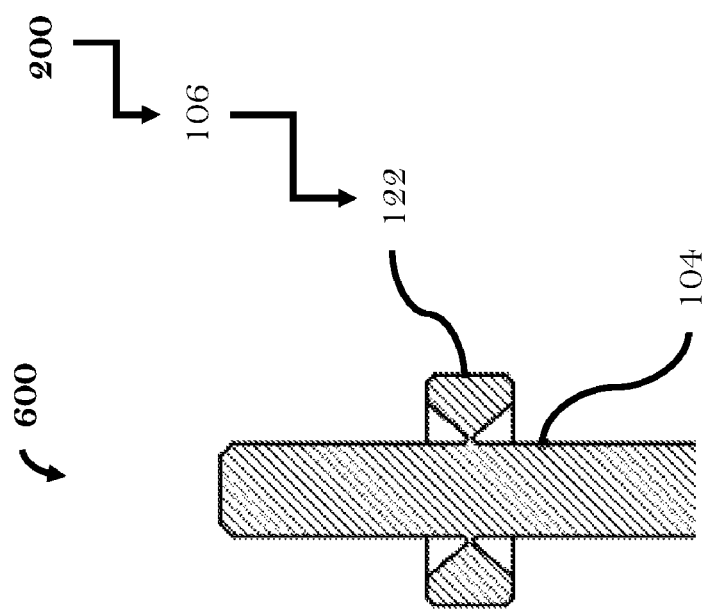
FIG. 5 depicts a cross-sectional view of a non-limiting variant of the connector 200 of FIG. 4A.

FIG. 5 depicts the cross-sectional view of the non-limiting variant of the connector 200 of FIG. 4A, in which the frangible portion 122 is integral to the valve stem 104.

Figure 6:
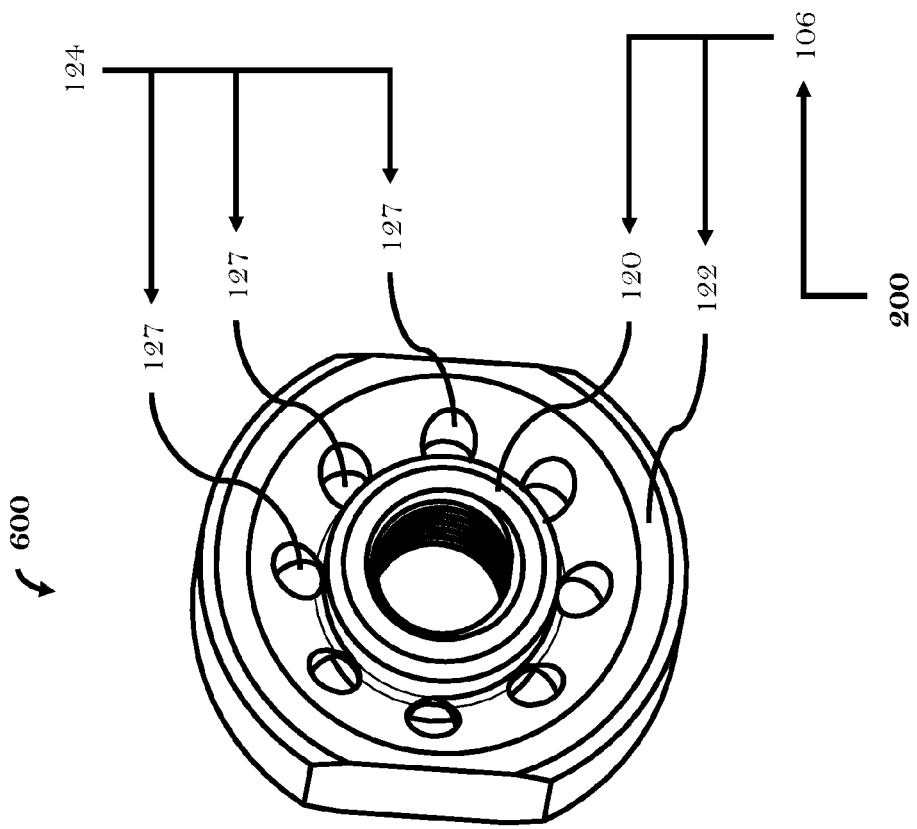
FIG. 6 depicts a perspective view of a non-limiting variant of the connector 200 of FIG. 4A.

FIG. 6 depicts the perspective view of the connector 200 of FIG. 4A according to a non-limiting variant, in which the area of weakness 124 includes a pattern of holes 127 extending from a top face of the shear member 106 through a bottom face of the shear member 106. According to another variant, the shear member 106 includes a disc. According to yet another non-limiting variant, the body 120 is configured to be concentric with the valve stem 104. The shear member 106 has a feature configured to weaken the shear member 106 along a thin band (that preferably, but not necessarily, sweeps 360 degrees) along an arc between an outer perimeter of the shear member 106 and a point of attachment of the shear member 106 to the body 120. According to a non-limiting variant, the area of weakness 124 includes notches introduced into a top face of the shear member 106. According to another non-limiting variant, the area of weakness 124 includes notches introduced into a bottom face of the shear member 106.

FIG. 7A depicts the cross-sectional view of the connector 300. The valve stem 104 includes a stem stop 131. The connector 300 includes: (i) the body 120, (ii) the frangible portion 122, and (iii) a lock 128. The lock 128 replaces the threads 123 of FIG. 4A. The lock 128 (which may also be called a "threaded nut" for example) is coupled (preferably via threads 129) with an end of the valve stem 104. Once the valve stem 104 is received in the body 120, the body 120 abuts against the stem stop 131 of to the valve stem 104, and the lock 128 may then be used to lock the body 120 with the valve stem 104 in a lockably secured manner.

FIG. 7B depicts the perspective view the connector 300 of FIG. 7A.

FIG. 7C depicts the cross sectional view of the connector 300 of FIG. 7A. Once the shear member 106 is: (i) threadably coupled to the valve stem 104 (as depicted in FIG. 4A), and/or (ii) lockably retained (via the lock 128 as depicted in FIG. 7A) to the valve stem 104, the valve stem 104 is inserted into the second bore 160 of the plate 110. The plate member 114 (which may also be called a tubular spacer, for example) is placed above the frangible portion 122 of the shear member 106, and the plate member 114 is retained with the plug 112 connected with the first bore 158. FIG. 7C depicts the shear member 106 being retained with the lock 128 (which may include a threadable nut, by way of example) to the valve stem 104.

FIGS. 8A and 8B depict the cross sectional views of the connector 200 of FIG. 4A, in which a case is depicted where once the valve stem 104 becomes seized during operation of the hot runner 600 of FIG. 10A, the shear member 106 breaks away thus allowing the valve stem 104 to remain stationary (relative to the mold 308 of FIG. 10A) while the plate 110 continues to move relative to the stationary valve stem 104. For the case (which is not depicted) where there may be a possibility of inadvertently permitting debris from a broken shear member 106 to become loose and free to move (this case is not depicted), to reduce this possibility of loose debris, a surface over which the shear member 106 becomes broken is kept at a constant diameter far enough above and below a point where the shear member 106 has become broken so that the broken shear member 106 remains captured for a full stroke of the plate 110, regardless of the position in which the valve stem 104 has become seized. An initial clearance is left between the body 120 and the plug 112 so that the plate 110 may move unimpeded if the valve stem 104 seizes in the gate-opened position, which is depicted in FIG. 8B.

FIGS. 9A and 9B depict the cross sectional views of the connector 200 of FIG. 4A. FIGS. 9A and 9B may be described exactly the same as FIGS. 8A and 8B, except in FIGS. 9A and 9B, the valve stem 104 has seized in the gate-closed position rather than in the gate-opened position (as depicted in FIGS. 8A and 8B). The valve stem 104 has seized (that is, has stopped moving relative to the plate 110) while the plate 110 is able to continue to move.

FIG. 10A depicts the schematic representation of the hot runner 600 having any one of the connector 100, the connector 200 and/or the connector 300. FIG. 10B depicts the schematic representation of the molding system 602 having the hot runner 600 of FIG. 10A. The hot runner 600 includes a hot runner to nozzle 302 that has a melt channel 304. The melt channel 304 is connected with a manifold 306. A plate actuator 310 is connected with the plate 110. The melt channel 304 is for delivering a molten molding material to a mold 308. The assembly 102 is offset from the hot runner nozzle 302. The assembly 102 is configured to move responsive to becoming actuated to do so. The valve stem 104 is positioned, at least in part, along the melt channel 304 of the hot runner nozzle 302. The valve stem 104 is configured to be moved, at least partially, along the melt channel 304 of the hot runner nozzle 302. The connector 100 is used with the hot runner 600.

FIGS. 11A, 11B, 11C and 11D depict the case for manual decoupling of the valve stem 104 of the hot runner 600 of FIG. 10A.

FIG. 11A depicts the case for manual decoupling of the valve stem 104. In this case, the hot runner 600 is placed in a maintenance mode so that: (i) molding material cannot be dispensed from the hot runner 600 into the mold 308 of FIG. 10A, and (ii) the plate 110 is positioned in a service position. In the service position, the plate 110 is moved away from a stationary clamp plate 139, which is not depicted in FIG. 11A but is depicted in FIGS. 11B, 11C and 11D. The plate 110 is moved to the service position so that each plug 112 no longer faces the stationary clamp plate 139. Once the plate 110 is moved away from the stationary clamp plate 139, a desired plug 112 may be: (i) accessed, and (ii) disconnected or decoupled from the plate 110 while leaving behind its associated stem valve 104 in the plate 110. In this manner, the valve stem 104 may be manually disabled by removing its associated plug 112. In the service position, the valve stem 104 may be non-destructively decoupled from the plate 110 by manually removing the plug 112 that holds the valve stem 104 in position relative to the plate 110, and thereafter no further operator interaction with the valve stem 104 is needed. The valve stem 104 may be re-coupled with the plate 110 by replacing its associated plug 112 at a later time.

FIG. 11B depicts the case where the hot runner 600 is placed in the maintenance mode, in which the plate 110 is: (i) positioned in the gate-opened position, and (ii) moved so that each plug 112 faces the stationary clamp plate 139. The mold 308 of FIG. 10A may be reattached to the hot runner 600 (that is, if the mold 308 was previously detached in the shut-down mode).

FIG. 11C depicts the normal operation mode, in which the valve stem 104 is maintained in the gate-closed position. In the gate-closed position, the valve stem 104 is held motionless relative to the gate that leads to the mold cavity of the mold 308 so that the molding material may not flow from the hot runner 600 into the mold cavity via the gate associated with the decoupled valve stem 104. In the gate-closed position, the plate 110 moves relative to the decoupled valve stem 104. To assist in holding the valve stem 104 motionless relative to the gate, deactivation of a nozzle heater (not depicted, but to known) that is associated with the decoupled valve stem 104 causes freezing of the molding material located in the hot runner nozzle 302 associated with the decoupled valve stem 104, so that frozen molding material (located in the hot runner nozzle 302) holds the decoupled valve stem 104 in place relative to the gate, so that the plate 110 may continue to operate (that is, to move relative to the decoupled valve stem 104) under normal operation mode.

FIG. 11D depicts the case where an injection-pressure force that is applied to the molding material in order to fill the mold 308 is of sufficient magnitude to urge the decoupled valve stem 104 to become inadvertently pushed from the gate-closed position to the gate-opened position. In the gate-opened position, the valve stem 104 has been moved away from the gate that leads to the mold cavity of the mold 308, so that the gate becomes inadvertently opened. Once the gate is inadvertently opened, the molding material (which is also called the "resin") will not flow from the mold 308 back into the hot runner nozzle 302; when injected resin moves from the manifold into the hot runner nozzle and forces the decoupled stem to the open position, that same resin remains in the nozzle and freezes. Once the valve stem 104 is no longer frozen in position relative to its associated gate, further movement of the decoupled valve stem 104 along its longitudinal axis is stopped by the stationary clamp plate 139, then the molding material that has flowed into the hot runner nozzle 302 may freeze (thus sealing the gate associated with the decoupled valve stem 104), and the hot runner 600 and the plate 110 may continue to operate normally. It will be appreciated that once inadvertent separation of the decoupled valve stem 104 from the gate has occurred, the molding material will become frozen in the gate.

FIGS. 12A and 12B depict the case for automatic decoupling of the valve stem 104 of the hot runner 600 of FIG. 10A.

FIG. 12A depicts the valve stem 104 inadvertently blocked or seized, and the shear member 106, which attaches the valve stem 104 to the plate member 114, has not yet sheared.

FIG. 12B depicts the shear member 106 in a sheared (broken) condition, so that the valve stem 104 may be automatically decoupled from the plate member 114, which is a part of the plate 110. The remaining valve stems may continue to function normally. As depicted in FIG. 11D, if injection pressure forces the valve stem 104 to become automatically decoupled and moved back away from the gate associated with the decoupled valve stem 104 and toward the stationary clamp plate 139, the stationary clamp plate 139 acts as a stop that limits motion of the valve stem 104 away from the gate associated with the valve stem 104. Automatic decoupling of the valve stem 104 relative to the plate 110 may occur regardless of the position in which the valve stem 104 has seized. The broken shear member 106 may be replaced at a later time (during maintenance, etc).

Figure 13:
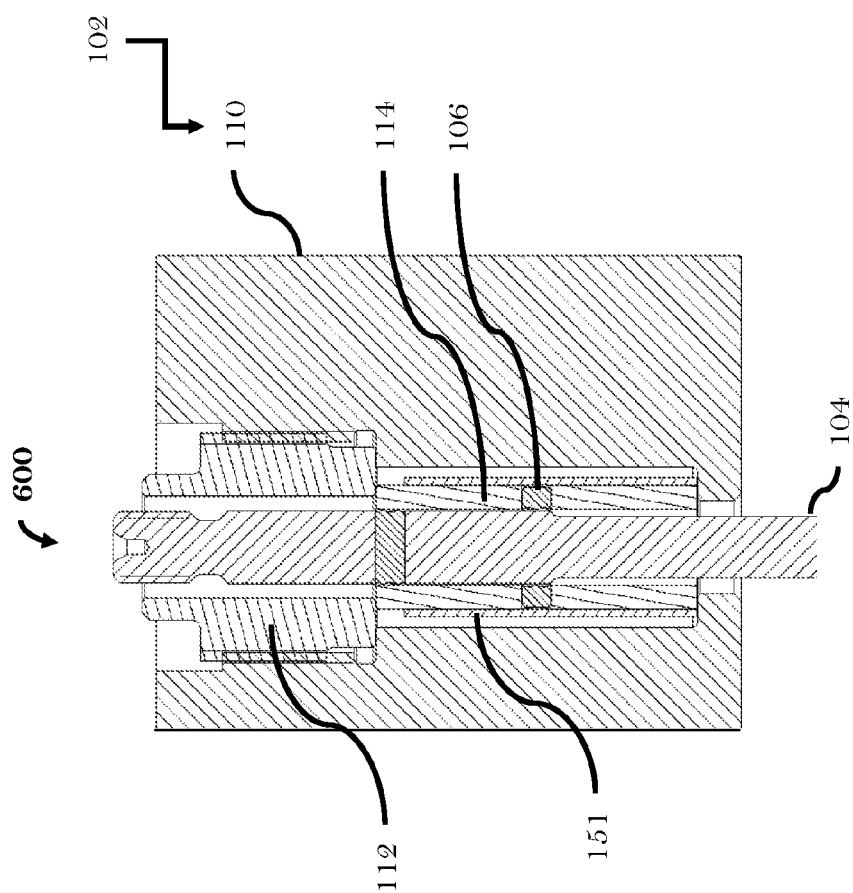
FIG. 13 depicts a cross sectional view of the hot runner 600 of FIG. 10A according to a non-limiting variant.

FIG. 13 depicts a cross sectional view of the hot runner 600 of FIG. 10A according to a non-limiting variant, in which the shear member 106 includes a retaining sleeve 151 that is placed around, at least in part, the plate member 114 so as to cover the shear member 106. The retaining sleeve 151 retains sheared or broken pieces of the shear member 106, so that the broken pieces do not escape and interfere with operation of the plate 110 or components of the hot runner 600.

The description of the non-limiting embodiments provides non-limiting examples of the present invention; these non-limiting examples do not limit the scope of the claims of the present invention. The non-limiting embodiments described are within the scope of the claims of the present invention. The non-limiting embodiments described above may be: (i) adapted, modified and/or enhanced, as may be expected by persons skilled in the art, for specific conditions and/or functions, without departing from the scope of the claims herein, and/or (ii) further extended to a variety of other applications without departing from the scope of the claims herein. It is understood that the non-limiting embodiments illustrate the aspects of the present invention. Reference herein to details and description of the non-limiting embodiments is not intended to limit the scope of the claims of the present invention. Other non-limiting embodiments, which may not have been described above, may be within the scope of the appended claims. It is understood that: (i) the scope of the present invention is limited by the claims, (ii) the claims themselves recite those features regarded as essential to the present invention, and (ii) preferable embodiments of the present invention are the subject of dependent claims. Therefore, what is protected by way of letters patent are limited only by the scope of the following claims:

What is claimed is:

1. A hot runner (600) being configured for filling a mold (308) with a molding material, the hot runner (600) comprising:
   a plurality of hot runner nozzles (302) each having a respective melt channel (304), each melt channel (304) connected with a manifold (306), each melt channel (304) is for delivering a molten molding material to the mold (308) being connected each hot runner nozzle (302);
   a plurality of valve stems (104) each being positioned, at least in part, along the melt channel (304) of respective hot runner nozzles (302), each valve stem (104) being configured to be moved, at least partially, along the melt channel (304) of the hot runner nozzle (302);
   a plate (110) including a plurality of actuation assemblies (102), the plate (110) being configured to actuate movement of the valve stems (104), each actuation assembly coupling respective valve stems (104) to the plate (110);
   a plate actuator (310) being connected with the plate (110), each actuation assembly (102) being offset from respective hot runner nozzles (302), the actuation assemblies (102) being configured to move responsive to becoming actuated to do so; and
   a plurality of safety connectors (100; 200; 300), each including:
      a shear member (106) releasably interlocking the valve stem (104) with the actuation assembly (102), once the shear member (106) has interlocked the valve stem (104) with the actuation assembly (102), the valve stem (104) becomes movable in response to movement of the actuation assembly (102), and the shear member (106) being configured to shear destructively, and responsive to a predetermined undesired force acting on the shear member (106), the shear member (106) shears and the valve stem (104) becomes released from the actuation assembly (102).

2. A molding system (602) having the hot runner (600) of claim 1.

3. An injection molding apparatus, comprising:
   an actuator;
   a valve pin plate connected to and translatable by the actuator;
   a plurality of valve pins, each valve pin associated with a mold gate of a mold cavity; and
   a plurality of breakable mechanical connections, each breakable mechanical connection securing a respective valve pin to the valve pin plate such that the valve pin plate simultaneously moves the valve pins between a closed position in which the valve pins are seated in their respective mold gates and an open position in which the valve pins are unseated from their respective mold gates;

wherein each breakable mechanical connection is capable of being independently broken to detach the respective valve pin from the valve pin plate thereby preventing the valve pin plate from moving the respective valve pin.

4. The injection molding apparatus of claim 3, wherein each breakable mechanical connection is configured to fail at a breaking load that is larger than a normal load exerted on the valve pin by the valve pin plate as operated by the actuator.

5. The injection molding apparatus of claim 3 further comprising:

a nozzle including a nozzle heater and defining a nozzle melt channel for directing a melt stream of moldable material through one of the mold gates into the respective mold cavity, the nozzle melt channel having the valve pin associated with the mold gate extending therethrough.

6. The injection molding apparatus of claim 5, wherein the melt stream hardens in the nozzle melt channel when the nozzle heater is turned off and thereby grips the valve pin extending therethrough to prevent the valve pin from moving with the valve pin plate.

7. A method of operating an injection molding apparatus, comprising:

providing a plurality of breakable mechanical connections connecting valve pins to a valve pin plate, wherein each valve pin is associated with a respective mold gate;

actuating the valve pin plate to move the valve pins between open positions where a melt stream of moldable material flows through the associated mold gates and closed positions where the melt stream is prevented from flowing through the associated mold gates;

breaking one of the breakable mechanical connections to disconnect one of the valve pins from the valve pin plate; and continuing to actuate the valve pin plate to move the valve pins that remain connected to the valve pin plate.

8. The method of claim 7, wherein the step of breaking one of the breakable mechanical connections comprises holding the respective valve pin stationary, and moving the valve pin plate to break the breakable mechanical connection.

9. The method of claim 8, wherein the step of holding the respective valve pin stationary includes turning off a heater of a nozzle having a nozzle melt channel through which the valve pin extends and allowing the melt stream to harden in the nozzle melt channel around the valve pin and thereby hold the valve pin stationary.

10. A molding system, comprising:

a plate actuator;

an actuation plate connected to and translatable by the plate actuator;

a plurality of valve stems, each valve stem associated with a mold gate of a mold cavity; and a plurality of breakable mechanical connections, each breakable mechanical connection coupling a respective valve stem to the actuation plate such that the actuation plate simultaneously moves the valve stems between a closed position in which the valve stems are seated in their respective mold gates and an open position in which the valve stems are unseated from their respective mold gates;

wherein each breakable mechanical connection is capable of being independently broken to uncouple the respective valve stem from the actuation plate thereby preventing the valve actuation plate from moving the respective valve stem.

11. The molding system of claim 10, wherein each breakable mechanical connection is configured to fail at a predetermined stem axial load.

12. The molding system of claim 10, further comprising:

a nozzle including a nozzle heater for directing a melt stream of molding material through one of the mold gates into the respective mold cavity, the respective valve stems being associated with the one mold gate.

13. The molding system of claim 12, wherein the molding material hardens in the nozzle when the nozzle heater is turned off and thereby holds the valve stem in place relative to the mold gate to prevent the valve stem from moving with the actuation plate.

14. A method of operating a molding system, comprising:

providing a plurality of breakable mechanical connections coupling valve stems to an actuation plate, wherein each valve stem is associated with a respective mold gate;

actuating the actuation plate to move the valve stems between open positions where molding material flows through the associated mold gates and closed positions where molding material is prevented from flowing through the associated mold gates;

breaking one of the breakable mechanical connections to uncouple one of the valve stems from the actuation plate; and continuing to actuate the actuation plate to move the valve stems that remain coupled to the actuation plate.

15. The method of claim 14, wherein the step of breaking one of the breakable mechanical connections comprises holding the respective valve stem stationary, and moving the actuation plate to break the breakable mechanical connection.

16. The method of claim 15, wherein the step of holding the respective valve stem stationary includes turning off a heater of a nozzle through which the valve stem extends and allowing the molding material to harden in the nozzle around the valve stem and thereby hold the valve stem stationary.

17. A molding system for delivering material from a manifold to mold cavities, the system comprising:

a plurality of valve gate nozzles in fluid communication with the manifold and arranged to deliver the material to the mold cavities through respective mold gates, each nozzle including a valve stem coupled to a valve stem actuator, each valve stem, upon actuation of the valve stem actuator, is adapted to move between a closed position in which the valve stem is seated in a mold gate and an open position in which the valve stem is unseated from the mold gate; and a breakable mechanical connection operatively coupling the valve stem to the valve stem actuator, wherein the breakable mechanical connection is capable of being broken to uncouple the valve stem from the valve stem actuator thereby preventing the actuator from moving the valve stem.

* * * * *